W. J. INGALLS.
Device for Cutting and Turning Round Bars of Metal.
No. 214,149. Patented April 8, 1879.
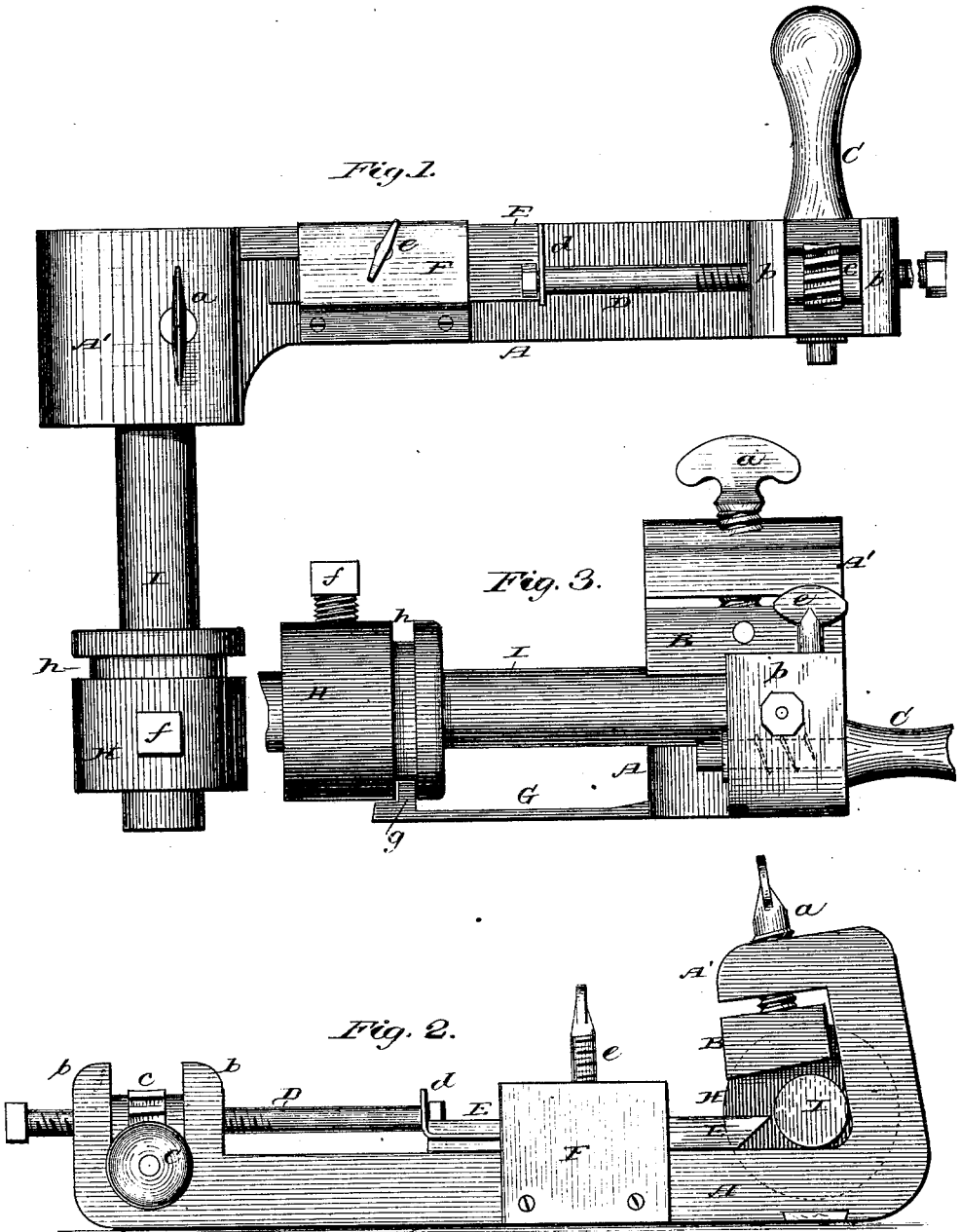

UNITED STATES PATENT OFFICE.

WALTER J. INGALLS, OF RICHFORD, VERMONT.

IMPROVEMENT IN DEVICES FOR CUTTING AND TURNING ROUND BARS OF METAL.

Specification forming part of Letters Patent No. 213,149, dated April 8, 1879; application filed February 1, 1879.

*To all whom it may concern:*

Be it known that I, WALTER J. INGALLS, of Richford, in the county of Franklin and State of Vermont, have invented certain new and useful Improvements in Machines for Cutting and Trimming Axles; and I do hereby declare that the following is a full, clear, and exact description of the invention, which will enable others skilled in the art to which it appertains to make and use the same, reference being had to the accompanying drawings, which form a part of this specification, and in which—

Figure 1 is a top view of my axle-cutter, illustrating also its application. Fig. 2 is a side elevation, and Fig. 3 is an end view.

Similar letters of reference indicate corresponding parts in all the figures.

This invention relates to that class of machines or implements which are used for cutting or grooving round iron—such as wagon-axles, for example—which, when worn, require cutting up of the shoulders to permit of the nut being set farther in, and thereby prevent lateral play or oscillation of the wheel upon its spindle.

It consists in the construction and arrangement of parts, having for its object to produce a cutting device which may be easily operated and will perform its work satisfactorily, and which is composed of but few parts, so as not to be liable to get out of order.

In the drawings, A is the cutter-stock, which is bent at one end to form an inclined jaw, A', which has a screw-threaded perforation, into which works a thumb-screw, a, pivoted at its lower end in a loose chuck-block, B.

The other end of the cutter-stock is made with two shoulders, b b, between and underneath which is a transverse perforation, in which works an endless screw or worm, operated by a projecting handle, C, which meshes with the teeth of a cylinder, c, having an axial screw-threaded perforation, through which passes a screw-threaded rod, D.

The end of rod D passes through a vertical plate or flange, d, secured upon the rear end of the chisel or cutter E, in such a manner that by turning rod D, by operating the handle C, the chisel may be advanced or retracted in its guide-sleeve F, which is secured upon the cutter-stock A, as shown, and of a width corresponding to the width of the chisel, which is prevented from moving vertically within its sleeve, and may be secured firmly in any given position by means of a vertical thumb-screw, e.

If desired, a gage-rule may be made upon one side of the cutter-stock to indicate the extent of the advancing or forward motion of the chisel.

Projecting laterally from the side of the cutter-stock A, opposite to the handle C and near the bottom, is a spring, G, provided with a raised flange or shoulder, g, near its end. The use of this will become apparent in describing the operation of this machine, to which I shall now proceed.

One end of the axle, shaft, or other round iron to be cut is inserted into a cylindrical sleeve, H, provided with an annular groove, h, and a set-screw, f. This sleeve is, by means of its set-screw, so adjusted upon the axle I that, when shoulder g of the gage-spring G is inserted into its groove h, that part of the axle which it is desired to cut shall be just opposite to or in a line with the cutting-point of the chisel E. The chuck-block B is then screwed down against the axle, and the operator, taking hold of handle C with one hand, turns the cutter-stock around the axle. As the stock rotates and the operator holds handle C firmly in his hand, the effect will be to rotate cylinder c and rod D, which advances the latter, and with it the cutter or chisel, gradually against the axle operated upon, cutting away a certain equal amount of metal at each round; in other words, the chisel will set or adjust itself automatically, so that the operation of cutting may be performed without stopping to adjust the cutter until the work is complete.

Having thus described my invention, I claim and desire to secure by Letters Patent of the United States—

1. The implement or device for cutting axles and round iron herein shown and described, consisting essentially of the cutter-stock A, having jaw A' and shoulders or resistance-blocks b b, chuck-block B, cutter E, rod D, toothed cylinder c, operating-handle C, and gage-spring G, the whole constructed and combined to operate substantially in the manner and for the purpose set forth.

2. In combination with the cutter-stock A A' and gage or guide spring G, having shoulder g, the sleeve H, having annular groove or recess h, and set-screw f, substantially as and for the purpose set forth.

In testimony that I claim the foregoing as my own I have hereunto affixed my signature in presence of two witnesses.

WALTER JAMES INGALLS.

Witnesses:
G. R. ORCUTT,
N. BROWN.